United States Patent

Yang

[11] Patent Number: 5,521,470
[45] Date of Patent: May 28, 1996

[54] PLURAL COMMUTATOR TYPE MOTORS WITH COMMON PARALLEL DRIVING CIRCUIT

[76] Inventor: Tai-Her Yang, 5-1 Taipin Street, Si-Hu Town, Dzan-Hwa, Taiwan

[21] Appl. No.: 351,745

[22] Filed: Dec. 8, 1994

Related U.S. Application Data

[63] Continuation of Ser. No. 68,202, May 27, 1993, abandoned.

[30] Foreign Application Priority Data

Jul. 30, 1992 [GB] United Kingdom .................. 9216219

[51] Int. Cl.⁶ ........................................... H02P 7/36
[52] U.S. Cl. ........................................... 318/83; 318/84
[58] Field of Search ..................... 318/254, 82, 83, 318/84, 249, 269, 258, 373, 375, 370, 379, 376, 66, 60, 55, 56, 63, 34; 307/33; 323/223, 271; 363/124

[56] References Cited

U.S. PATENT DOCUMENTS

| | | | |
|---|---|---|---|
| 3,792,330 | 2/1974 | Ottoson | 318/375 |
| 3,798,520 | 3/1974 | Friend et al. | 318/55 |
| 3,843,912 | 10/1974 | Anderson | 318/258 |
| 3,876,920 | 4/1975 | Meissen et al. | 318/370 |
| 3,965,409 | 6/1976 | Klautschek | 363/124 |
| 4,004,209 | 1/1977 | Lawson, Jr. | 307/33 |
| 4,054,821 | 10/1977 | Williamson | 318/493 |
| 4,264,846 | 4/1981 | Sauer et al. | 318/249 |
| 4,355,267 | 10/1982 | Franz, Jr. et al. | 318/60 |
| 4,450,388 | 5/1984 | Markham | 318/60 |
| 4,529,919 | 7/1985 | Melocik et al. | 318/373 |
| 4,634,942 | 1/1987 | Naruto | 318/375 |
| 4,875,001 | 10/1989 | Bergk | 323/223 |

Primary Examiner—John W. Cabeca
Attorney, Agent, or Firm—Bacon & Thomas

[57] ABSTRACT

At least two motors share a common driving circuit. The armatures of the motor are connected in parallel between the terminals of the power supply. Limiting resistors and choke diodes are included to prevent imbalances caused by different loads on the respective armatures and to maintain similar operating characteristics in the motors. The parallel motors can include either a series field winding, or shunt or permanent magnet excitation.

6 Claims, 1 Drawing Sheet

PLURAL COMMUTATOR TYPE MOTORS WITH COMMON PARALLEL DRIVING CIRCUIT

This application is a Continuation of application Ser. No. 08/068,202, filed May 27, 1993, abandoned.

BACKGROUND OF THE INVENTION

When a conventional commutator type motor with a series or shunt field winding, or a permanent-magnet field, is used in parallel with another motor and driven by a common circuit, it is difficult to balance the operating characteristics of the two motors, particularly in the case of series motors which have a high torque to running speed ratio. Nevertheless, balancing of the operating characteristics of such motors is often useful, for instance, when applied to an electric loader with unequal loads.

SUMMARY OF THE INVENTION

The invention is an operating circuit for motors operating in parallel, in which currents resulting from voltage imbalances between respective armatures are suppressed or "choked." The invention is applicable to two or more series or compound motors having either series windings or permanent-magnet or shunt winding type excitation. Preferably, the armature windings are respectively connected in series with choke diodes along the positive direction of current, and each end of the choke diodes is connected in parallel with each other and in parallel with a limit resistor, and further connected in series with respective series windings or series connected to parallel series windings. As a result, currents circulating between the parallel armatures are suppressed despite load differences, resulting in improved operating characteristics of the individual motors while still allowing distribution of torque and regenerative power braking. The armature windings may be parallel connected to each other and in series with anti-circulatory diodes, or series connected to limit resistors for restraining circulatory flow, or the anti-circulatory diodes may be parallel connected to the limit resistors for providing a regulation function for torque distribution among the motors and a restraining function for current at the moment of regenerating power braking, or the aforesaid series limit resistors and choke diodes may be used jointly, with resistors connected in parallel to the choke diodes.

DETAILED DESCRIPTION OF THE INVENTION

The first preferred embodiment of the parallel motor driving circuit is a common commutator type driving circuit for two or more series motors (or compound motors with series windings). The armature windings of the motors are connected in parallel with each other and then, in the case of a series motor, series connected to respective series windings, allowing EMF and current to be averaged among respective motor armatures, while at the same time enabling the characteristics of respective motors to become uniform as a result of a simultaneous increase or decrease in series field winding excitation current among the respective motors. The armature windings are respectively series connected with choke diodes in the positive direction of current, and each end of the choke diodes is connected in parallel with each other after parallel connection to a limiting resistor, and further series connected with respective series windings or series connected to the parallel series windings for operating respectively during synchronous operation even when the load is uneven, with the help of mutual choking between the diodes to limit circulatory flow by means of the limit resistors. The principles of the series field winding embodiment also apply to commutator type motors with permanent-magnet type or shunt type fields, according to a further preferred embodiment of the invention.

Figure 1:
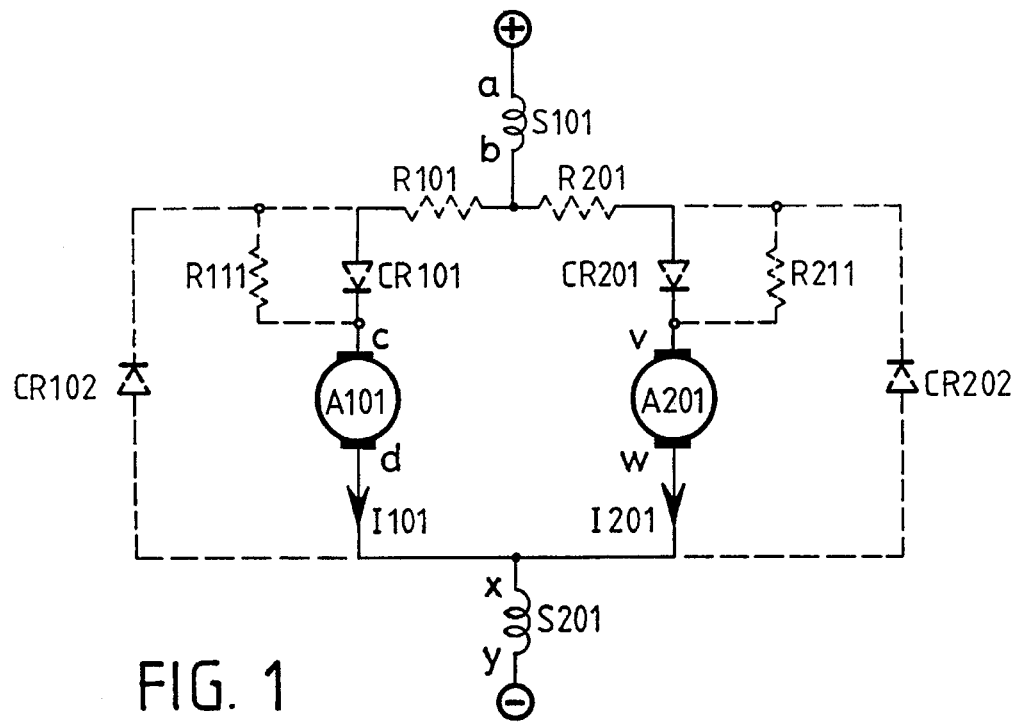
FIG. 1 is a circuit diagram showing commutator type parallel motor driving circuit according to a first preferred embodiment of the invention.

FIG. 1 is a circuit diagram showing the basic principle of the preferred driving circuit, which includes:

a first motor having a series winding S101 and armature A101; and a second motor having a series winding S201 and armature A201.

End a of the series field winding S101 of the first motor is connected to the positive terminal of the power supply while end b is connected to end c of armature A101, end v of the armature A201 of the second motor is connected to end b of the series field winding S101 of the first motor while end b is connected to end c of armature A101, end w of the armature A201 of the second motor is connected to end x of the series field winding S201 and end d of the armature A101 of the first motor, and end y of the series field winding S201 of the said second motor is connected to the negative end of power supply.

When the motors are driven normally, current on the series windings S101 and S201 is the same and equal to the sum of the two armature currents, and according to the operation of the aforesaid basic circuits, when the first motor load is increasing, its speed is decreasing while at the same time its EMF is also decreasing, resulting in an increase in armature current I101, whereby the series field excitation current of the two motors is increased simultaneously and the speed of the second motor is also decreased. Compared to a conventional arrangement of two series motors directly connected in parallel, the speed difference between the motors is smaller, resulting in improved parallel stability. When the second motor load is increasing, armature current I201 is also increasing, while the response of the first motor is the same, the load current value of each motor series winding being summed in each series motor armature to obtain a total effective current value. Unlike conventional series motors in the illustrated arrangement, the series field load current value is the first armature load current value, i.e., each motor has a series field winding with a greater load current value.

The aforesaid circuit is a basic circuit, the performance of which is improved by means of the following elements, also shown in FIG. 1:

First, each armature A101 and A201 may be series connected to a limit resistor R101 and R201, respectively, when the load is of a fast changing type, so as to prevent a decrease in circulatory loss under another armature as the load when the load is decreasing.

Second, diodes CR101 and CR201 connected in series with the armature may be parallel connected to the limit resistors R111 and R211, respectively, in place of the original limit resistors R101 and R201 so as to reduce thermal loss under positive driving and to maintain a common driving torque when the speed differs between the motors, while preventing loss of torque as a result of the series connected diodes when the speed difference between the motors is small, and to provide for a limited output during power regeneration braking. Finally, as shown in FIG. 1, armature flywheel diodes CR102 and CR202 may be added as required by the application or use.

Figure 2:
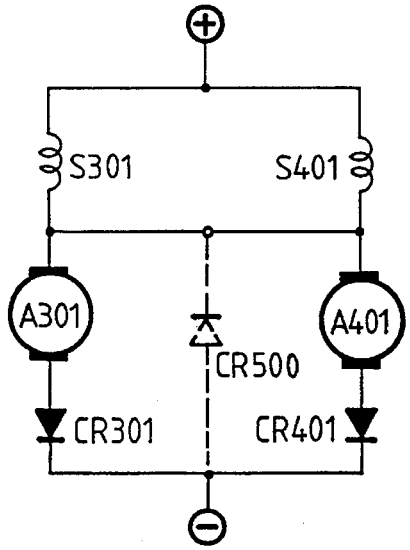
FIG. 2 is a circuit diagram showing a variation of the embodiment of FIG. 1.

FIG. 2 shows an embodiment in which the series excitation windings of the preferred commutator type motors are connected in parallel, and in which:

two series (or compound) motors have windings and armatures respectively connected in parallel, with each series winding S301, S401 being connected in parallel each other;

armatures A301 and A401 are respectively connected in series with choke diodes CR301, CR401, each of which is positively oriented relative to the current, and a flywheel diode CR500 is provided for absorbing power supply fluctuations in order to keep operation stable; and the motor set may consist of two or more than two sets, the series windings still being parallel connected as mentioned above, and the armatures being connected in series with diodes along the positive direction of current, in parallel with each other, and series connected to the series field windings as mentioned above.

For practical application, the present commutator type motor differential parallel operating circuit may be implemented in a flexible manner as follows:

(1) the circuit may be used in connection with two or more than two independent commutator motors or have a common housing structure;

(2) the respective motors may be either series motors or compound motors with series windings, and when the motors are compound motors, the shunt field windings may be conventional long compound, short compound, auxiliary compound, or differential excitation winding;

(3) the preferred commutator type motor driving circuit can be used to form a conventional motor set series or parallel connected to an impedance switch while increasing the selection of impedance alternatives; and (4) each motor series winding may be equally-divided into several parts parallel connected to each other and then series connected to the armatures.

The preferred circuit may further be applied to permanent-magnet type or shunt field winding type multiple motors connected in parallel according to another preferred embodiment of the invention, in which two or more than two motors with permanent-magnet type or shunt winding type have armature windings connected in parallel with each other and in series with respective anti-circulatory or limit resistors, or both, to prevent excessive circulatory flow as a result of an unbalance load between the armatures.

Because DC commutator type operation with multiple motors parallel connected to permanent-magnet type field or shunt winding type are subject to influence by the unstable load, balanced operation is difficult to obtain between the armatures of the motors. Some motors are easily affected by an external force resulting in an armature power generation effect on other motors, which serve as the load, causing excessive circulatory flow between the armatures and possibly even armature burn down, such as is often the case for electric loaders which respectively drive different wheels during turning. The present commutator type motor driving circuit of this embodiment solves the problem of one motor serving as a load for the other.

Figure 3:
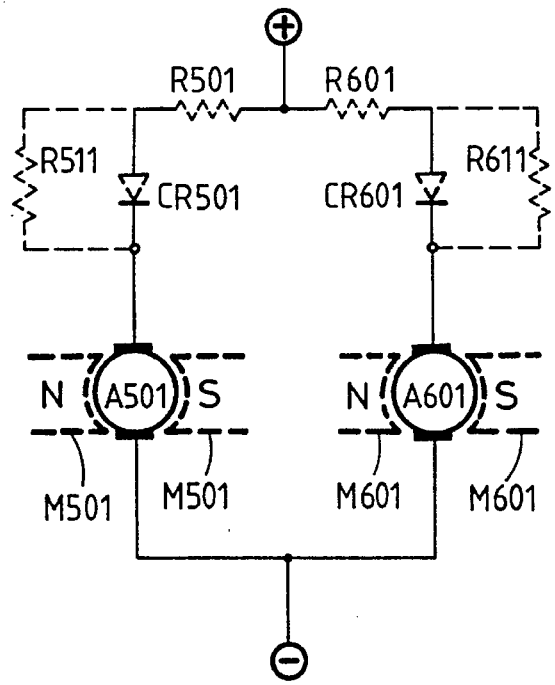
FIG. 3 is a circuit diagram showing a further variation of the embodiment of FIG. 1.

FIG. 3 is a circuit diagram showing the basic principles of this preferred commutator type motor differential parallel operating circuit with an unbalance voltage circulation reduction function, applied to permanent-magnet type or shunt winding type fields. The circuit of this embodiment includes:

a first motor having a permanent-magnet type field M501 and armature A501; and a second motor having a permanent-magnet type field M601 and armature A601.

Each armature is connected in series with limit resistors R501 and R601 respectively. The first motor armature A501 and the second motor armature A601 are series connected to the limit resistors R501 and R601, respectively, to prevent another armature from becoming the load while limiting circulatory currents when the load is decreasing as well as to maintain each motor with a distribution torque between the motors.

Each armature is also respectively series connected to the circulatory current limiting diodes, and each diode is parallel connected to the limit resistors respectively. The first motor armature A501 and the second motor armature A601 are series connected to choke diodes CR501 and CR601 respectively in a positive direction to prevent another armature from becoming the load and forming a circulatory flow when the load is reducing. The diodes CR501 an CR601 are connected in series with the armatures and may be parallel connected to the resistors R511 and R611 in place of the original limit resistors R510 and R601 and provided as limit resistors for regenerative power generation as well as to maintain each motor with a distribution torque between the motors and to reduce thermal loss under positively driving, or further each armature may be series connected to the limit resistors R501 and R601 respectively.

For practical application, the preferred commutator type motor driving circuit of this embodiment may be used in a flexible manner as follows:

(1) The circuit may be used in connection with two or more than two independent commutator motors or have a common housing structure;

(2) The motors may include two or more than two motors with permanent-magnet type field and commutator type armatures, or motors with shunt winding type fields and commutator type armatures, i.e., a shunt winding may be used in place of a permanent magnet for forming field.

I claim:

1. Apparatus comprising:

at least two armatures connected in parallel between first and second electrodes of a power source;

a first series winding having first and second ends, the first end of the first series winding being connected to the first electrode of the power source;

a second series winding having first and second ends, the first end of the second series winding being connected to the second electrode of the power source and the second end of the second series winding being connected to both of said armatures;

choke diodes connected in series between respective said armatures and the first series winding;

a first limiting resistor having a first end connected to the second end of the first series winding and a second end connected to one of the respective armatures, said first limiting resistor also being connected in parallel with a first one of said choke diodes; and a second limiting resistor having a first end connected to the second end of the first series winding and a second end connected to a second one of the respective armatures, said second limiting resistor also being connected in parallel with a second one of said choke diodes.

2. Apparatus as claimed in claim 1, further comprising limiting resistors connected in series between respective said parallel connected resistors and diodes and said one of said series windings.

3. Apparatus as claimed in claim 2, further comprising flywheel diodes connected in parallel with said armatures.

4. Apparatus as claimed in claim 1, further comprising flywheel diodes connected in parallel with said armatures.

5. Apparatus comprising:

at least two armatures connected in parallel between first and second electrodes of a power source;

choke diodes connected in series between respective said armatures and one of the power source electrodes; and a first limiting resistor having a first end connected to the first electrode of the power source and a second end connected to one of the respective armatures, said first limiting resistor also being connected in parallel with a first one of said choke diodes; and a second limiting resistor having a first end connected to said first electrode of the power source and a second end connected to a second one of the respective armatures, said second limiting resistor also being connected in parallel with a second one of said choke diodes, wherein said armatures are permanent magnet motor armatures.

6. Apparatus as claimed in claim 4, further comprising limiting resistors connected in series between respective said parallel connected resistors and diodes and said one of the power source electrodes.

* * * * *